Sept. 12, 1950  R. V. DANIELSON  2,522,166
AUTOMATIC HOIST LOCK AND HOIST CONTROL
Filed March 7, 1949
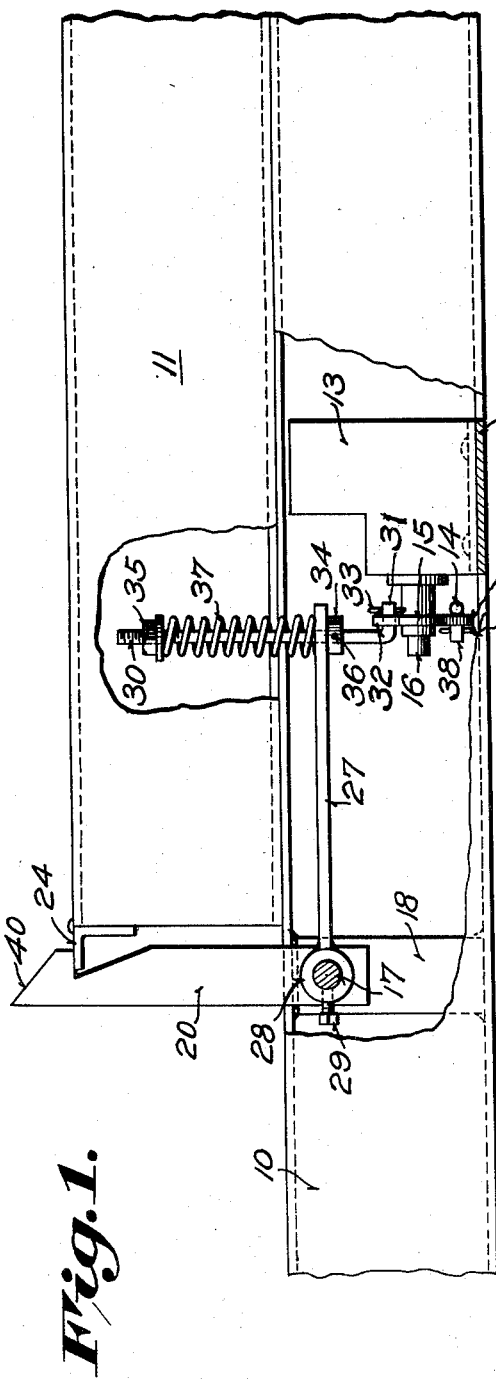
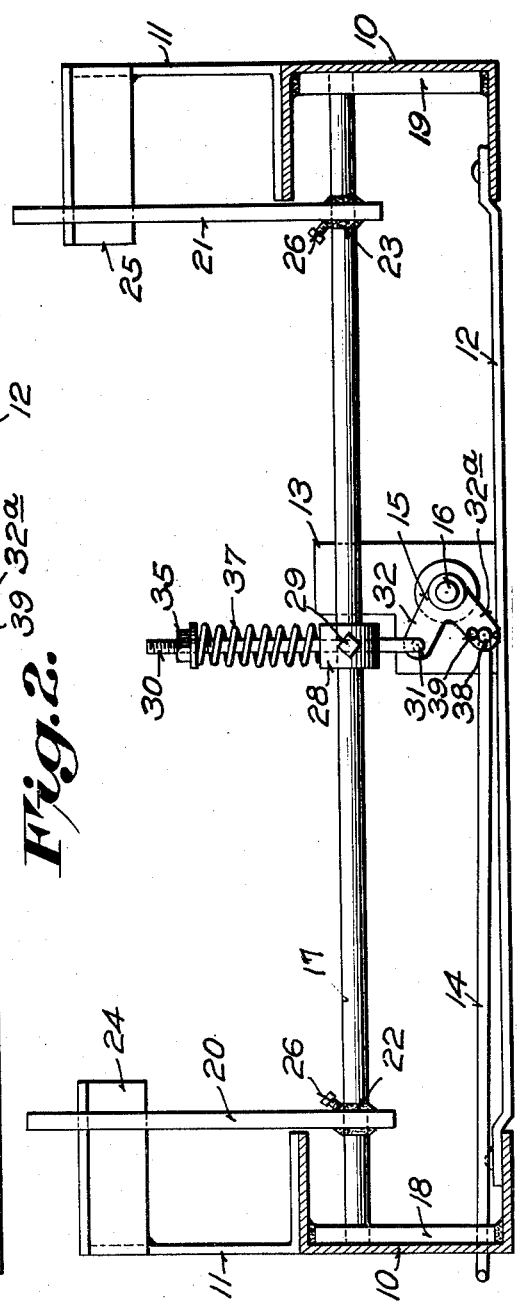
INVENTOR.
RUDOLPH V. DANIELSON,
BY Vernon A. Dorsey
ATTORNEY Patented Sept. 12, 1950

2,522,166

UNITED STATES PATENT OFFICE 2,522,166

AUTOMATIC HOIST LOCK AND HOIST CONTROL

Rudolph V. Danielson, Sioux Falls, S. Dak., assignor of one-half to M. A. Olson, Sioux Falls, S. Dak.

Application March 7, 1949, Serial No. 79,987

6 Claims. (Cl. 298—38)

1

The present invention relates generally to vehicle dump boxes and more particularly to a single control arrangement for locking and releasing the dump box of a vehicle, and adapted to simultaneously control the operation of a fluid power system arranged to tilt the box to dumping position.

Usually prior dump box latches, locks or the like, are separate from the fluid power systems for tilting the dump boxes. This often causes trouble as the operator sometimes forgets to release the dump box latch prior to initiating the actuation of the fluid power system, with the result that the latches are broken and must be replaced.

It is accordingly, an object of the present invention to develop a single control system, whereby the actuation of one control rod simultaneously releases the latch or lock means and starts the hydraulic power system to tilt the dump box.

Another object of the invention is to provide novel operative connecting means controlled by a single rod, whereby a power take-off of the vehicle and the pump of a fluid power system carried by the vehicle may be selectively connected and disconnected for simultaneous and cooperative operation by a pull or push action on the control rod.

A further object is to provide a combined novel fluid control and locking means for self-propelled vehicle mounted dump boxes.

With the foregoing and other objects in view, which will now appear to others skilled in the art, the present invention will be more fully described hereinafter, and will be more particularly pointed out in the claims appended hereto.

In the drawing, wherein like numerals refer to like or corresponding parts throughout the several views:

Figure 1 is a side view of a dump vehicle chassis and dump box frame broken away and partly in elevation and cross section to illustrate the connecting means of the present invention.

Figure 2 is an end view taken in transverse cross section of the front end of the chassis frame and in end elevation of the dump box and locking means.

Referring in detail to the drawing, there are only illustrated the elements, which specifically relate to the present novel locking means and connections therefor. For example, Fig. 1 represents a vehicle chassis 10 and the under frame bars 11 of the usual dump box, not shown.

Supported by the chassis 10 on a cross bar 12, see Fig. 2, is a conventional hydraulic pump 13. The pump 13 may be of any suitable type and is positioned in the fluid circuit of any suitable or known fluid or hydraulic system arranged to be actuated by a power take-off of the vehicle, such as described and illustrated, for example, in Patent 1,165,825, dated December 28, 1915, issued to Garfield A. Wood.

Leading from the side of the vehicle is a reciprocable control rod 14, see Fig. 2. This rod extends across the chassis 10 and connects to a bell-crank lever 15 keyed or otherwise fixed to a shaft 16. The shaft 16 is adapted to be moved to operatively connect or disconnect the pump 13 with the vehicle power take-off mechanism, such as in the above-mentioned patent.

The specific details of the hydraulic system are immaterial as the invention primarily resides in the single rod controlled connecting means from the shaft 16 to a rocker shaft 17 mounted transverse to the chassis 10 in oppositely disposed bearing plates 18 and 19 respectively. Accordingly, it is to be understood that the shaft 16 may control a valve in the fluid system instead of the pump. Also, the pump 13 may be permanently connected with the power take-off of the vehicle to provide a continuously circulating fluid system.

The rocker shaft 17 supports a pair of swinging bolts, such as the lock arms 20 and 21. Each of these lock arms is formed with apertured bushings 22 and 23, respectively. The bushings are adjustable, if desired, along the length of the rocker shaft 17 to properly position the lock arms for engagement with a pair of spaced angle latch brackets 24 and 25 on the upper point of each side of the dump box frame members. Upon adjustment of the lock arms to proper position, the same may be held fixed by set screws 26, see Fig. 1, or they may be welded in position if the adjustable feature is not desired.

Similarly mounted medially on the rocker shaft 17, is a lever 27 formed on an end with an apertured bushing or collar 28. This bushing is adjustable on the rocker shaft 17 between the lock arms and is held fixed by a set screw 29.

The lever 27 extends at substantially right angles from the axis of rocker shaft 17 and is formed with an opening extending in the direction of the dump box frame 11, which normally rests on the chassis 10 in a plane above the same. Extending upward through the opening in the lever 27 is an actuator rod 30. The lower end of the rod 30 is formed to define a hook 31, which connects with an arm 32 of the bell-crank lever 15. The hook 31 is retained in connection with the bell-crank arm 32 by a cotter pin 33, see Fig. 1.

The shank of the actuator rod 30 receives upper and lower lock nuts 34 and 35, respectively.

The lower lock nut 34 is fixed as shown in Fig. 1. It is held in place below the lever 27 on the rod 30 by a set screw 36 and above the lever 27 coiled around the rod 30 is a spring 37. One end of the spring 37 rests on the upper side of the lever 27 opposite lock nut 34 and the other end of the spring is positioned against the upper lock nut 35 threaded for adjustment on the threaded end of the rod 30. With the spring 37 thus mounted between the rod 27 and the threadedly adjustable upper lock nut 35, the tension of the spring can be regulated by adjusting the nut 35 to or from the rod 27 and in turn regulate the resistance of the lock arms to disengagement from the cooperating angle brackets 24 and 25.

The reciprocable control rod 14 connects to the other arm 32a of the bell-crank lever 15, this end of the rod 14 being formed with an apertured hook end 38 for this purpose. A cotter-pin 39 secures the end 38 to the arm 32a, and the following paragraphs will give a brief summary of the operation of the present invention.

*Operation*

The operation of the device is controlled by simply pulling the control rod 14, to thereby rock the bell-crank lever 15. Lever 15 thus imparts movement to the shaft 16, to thereby actuate the valve of the fluid system and simultaneously the lever 15 imparts from arm 32 thereof a vertical movement to the actuating rod 30 to swing the lever 27 upward and rock the lock arms 20 and 21 away from the angle brackets 24 and 25 to release the dump box frame 11.

When the dump box frame 11 is returned from the tilted dumping position to loading position, the angle brackets 24 and 25 ride down the slanted ends 40 of the lock arms and force them back against the action of the spring 37, until the brackets engage under the notched heads of the lock arms, which snap forward against the angle brackets.

Thus there is provided a single lever control system for the dual purpose of unlocking and locking a dump box frame and tilting the said frame with respect to the chassis frame of a vehicle to dumping and non-dumping positions in coordination with the said unlocking and locking of the dump box frame.

Further modifications will probably now occur to others skilled in the art and it is to be expressly understood that the present invention is to be limited only by the prior art and the scope of the appended claims.

What is claimed is:

1. In a control system for vehicle carried dump box frame operated by fluid power systems to dumping and non-dumping positions, a control rod, means for actuating the fluid power system, lock means adapted to normally retain said dump box frame in non-dumping position, a bell-crank lever mounted on said first-named means, said bell-crank lever having diverging arms, one arm being connected to said control rod and the other arm to a lock means actuating rod, a rocker bar carrying said lock means, and a lever fixed to said rocker bar, said lock means actuating rod being connected to said lever to thereby impart rocking action to said rocker bar to control said lock means.

2. The device described in claim 4, wherein a spring is mounted on said lock actuating rod to control the resistance of said lock means to latching position.

3. In a control system for vehicle carried dump box frames operated by power systems to dumping and non-dumping positions, a manual control rod, a power control member for the system, a rock bar turnably mounted in the chassis of the vehicle, lock arms keyed to said bar, cooperating latch brackets on the dump box frame opposite the head of each lock arm engaging said latch brackets when the dump box frame is in non-dumping position, a lever fixed to a medial point on said rock bar formed with an aperture in its end opposite to said rock bar, a rod extending through the aperture in the lever, a spring mounted on the rod above the lever, a lock nut fixed on the rod below the lever, an adjustable lock nut mounted on the rod above the end of the spring to provide for adjusting the tension of said spring, and a compound lever adapted to interconnect said control rod, said power control means for the power system and the said actuating rod of the lock arm connections.

4. In a control system for vehicle carried dump box frames operated by power systems to dumping and non-dumping positions, a manual control rod, a power control member for the system, a rock bar turnably mounted in the chassis of the vehicle, lock arms keyed to said bar, cooperating latch brackets on the dump box frame opposite the head of each lock arm engaging said latch brackets when the dump box frame is in non-dumping position, a lever fixed to a medial point on said rock bar formed with an aperture in its end opposite to said rock bar, a rod extending through the aperture in the lever, a spring mounted on the rod above the lever, a lock nut fixed on the rod below the lever, an adjustable lock nut mounted on the rod above the end of the spring to provide for adjusting the tension of said spring, and a bell-crank lever adapted to interconnect said control rod, said power control means for the power system and the said actuating rod of the lock arm connections.

5. A locking arrangement for dump box frames tiltably mounted on a vehicle chassis comprising a bell-crank lever, a control rod connected to a part of said lever, a vertically extending rod connected to another part of said lever, a spring on said rod, a rock lever connection from said rod, lock arms actuted by said rock lever connection for locking arrangement with the latch brackets on the dump box frame, the tension of said spring being adjustable to thereby regulate the resistance of said lock arms to movement to and from locking position.

6. In a vehicle carried hydraulic system with a power transmitting drive connectable from a power take-off of the vehicle with the shaft of a suitable fluid pump for actuating the system to thereby impart movement to the supporting frame of a dump box pivotally mounted on the chassis of the vehicle, a latch arrangement on the vehicle chassis adapted to normally retain the dump box and its frame in non-dumping position, a control rod, and a bell-crank lever having a pair of diverging arms, one arm being connected to an end of said rod and the second of said arms being connected to actuating means for said latch arrangement, with the apex of the said bell-crank lever being mounted to connect the power take-off of the vehicle with the shaft of the said pump.

RUDOLPH V. DANIELSON.

REFERENCES CITED

The following references are of record in the file of this patent:

UNITED STATES PATENTS

| Number | Name | Date |
| --- | --- | --- |
| 1,165,825 | Wood | Dec. 28, 1915 |
| 2,401,660 | Penney | June 4, 1946 |